United States Patent
Ding

(10) Patent No.: US 11,082,335 B2
(45) Date of Patent: Aug. 3, 2021

(54) APPARATUS AND PACKET PROCESSING METHOD

(71) Applicant: HUAWEI TECHNOLOGIES CO., LTD., Guangdong (CN)

(72) Inventor: Chenglong Ding, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/800,942

(22) Filed: Feb. 25, 2020

(65) Prior Publication Data

US 2020/0195549 A1  Jun. 18, 2020

Related U.S. Application Data

(63) Continuation of application No. PCT/CN2018/090197, filed on Jun. 7, 2018.

(30) Foreign Application Priority Data

Aug. 28, 2017 (CN) .......................... 201710750741.5

(51) Int. Cl.
*H04L 12/715* (2013.01)
*H04L 12/721* (2013.01)
(Continued)

(52) U.S. Cl.
CPC .............. *H04L 45/38* (2013.01); *H04L 45/48* (2013.01); *H04L 45/64* (2013.01); *H04L 45/745* (2013.01);
(Continued)

(58) Field of Classification Search
CPC ......... H04L 45/38; H04L 45/48; H04L 45/64; H04L 45/745; H04L 49/355; H04L 69/22;
(Continued)

(56) References Cited

U.S. PATENT DOCUMENTS 8,730,963 B1 * 5/2014 Grosser, Jr. ........... H04L 45/245
370/392
2003/0217137 A1 11/2003 Roese et al.
(Continued)

FOREIGN PATENT DOCUMENTS

CA       2815923 A1    9/2003
CN     104065571 A    9/2014
(Continued)

OTHER PUBLICATIONS

Shie-Yuan et al: "Constructing an Optimal Spanning Tree Over a Hybrid Network with SDN and Legacy Switches", ?20th IEEE Symposium on Computers and Communication (ISCC),Dec. 31, 2015.
(Continued)

*Primary Examiner* — Mohamed A Kamara
(74) *Attorney, Agent, or Firm* — Womble Bond Dickinson (US) LLP

(57) ABSTRACT

The method is applied to an SDN network, where the SDN network includes one target computing apparatus and a plurality of openflow switches. The target computing apparatus communicates with the plurality of openflow switches. The method includes: receiving, by the target computing apparatus, a first bridge protocol data unit (BPDU) packet sent by a first openflow switch, where the first BPDU packet carries a device identifier and a port identifier; generating, by the target computing apparatus, a feedback packet based on the first BPDU packet, where the feedback packet includes spanning tree protocol information of a conventional switching device, and carries the port identifier; and sending, by the target computing apparatus, the feedback packet to the first openflow switch based on the device identifier.

9 Claims, 5 Drawing Sheets

(51) Int. Cl.
  *H04L 12/753* (2013.01)
  *H04L 12/741* (2013.01)
  *H04L 12/931* (2013.01)
  *H04L 29/06* (2006.01)
  *H04L 29/08* (2006.01)

(52) U.S. Cl.
  CPC ............ *H04L 49/355* (2013.01); *H04L 69/22* (2013.01); *H04L 69/322* (2013.01)

(58) Field of Classification Search
  CPC ... H04L 69/322; H04L 45/66; H04L 41/0806; H04L 41/00; H04L 41/0893; H04L 45/18; H04L 49/253; H04L 49/70; G06F 9/455
  See application file for complete search history.

(56) References Cited

U.S. PATENT DOCUMENTS

| | | |
|---|---|---|
| 2016/0043941 A1 | 2/2016 | D'Heureuse et al. |
| 2016/0156550 A1 | 6/2016 | Song |
| 2017/0005919 A1* | 1/2017 | Wang ..................... H04L 12/64 |

FOREIGN PATENT DOCUMENTS

| | | |
|---|---|---|
| CN | 104426731 A | 3/2015 |
| CN | 106330697 A | 1/2017 |

OTHER PUBLICATIONS

IEEE 802.1Q,IEEE Standard for Local and metropolitan area networks,Virtual Bridged Local Area Networks,2005,total 303 pages.

Xinchun Bao,:"Research on Data Center Network Based on SDN/OpenFlow".2016,total 80 pages.

Recommendation ITU-T G.8032/Y.1344,Series G: Transmission Systems and Media, Digital Systems and Networks Packet over Transport aspects Ethernet over Transport aspects Series Y: Global Information Infrastructure, Internet Protocol Aspects and Next-Generation Networks Internet protocol aspects Transport,Mar. 2010,total 98 pages.

* cited by examiner

APPARATUS AND PACKET PROCESSING METHOD

CROSS-REFERENCE TO RELATED APPLICATIONS

This application is a continuation of International Application No. PCT/CN2018/090197, filed on Jun. 7, 2018, which claims priority to Chinese Patent Application No. 201710750741.5, filed on Aug. 28, 2017. The disclosures of the aforementioned applications are hereby incorporated by reference in their entireties.

TECHNICAL FIELD

This application relates to the field of communications technologies, and more particularly, to an apparatus and a packet processing method.

BACKGROUND

A software-defined networking (SDN) network is a novel network innovation architecture and an implementation of network virtualization. The SDN network includes an SDN controller and a plurality of openflow switches. The openflow switches provide a most basic and simplest forwarding function. Openflow protocol interaction is performed between the SDN controller and the openflow switches. The SDN controller can collect information about the openflow switches through an openflow interface, and can deliver a control instruction through the openflow interface, to instruct the openflow switches to receive and send data.

In a conventional network, a spanning tree protocol is introduced to eliminate a loop in the network. Devices in the network complete computation of protocols by exchanging spanning tree protocol packets, and finally blocking is performed on a specific port, to achieve an effect of eliminating the loop.

When interconnection is implemented between the SDN network and the conventional network, because the conventional network supports a spanning tree protocol, the openflow switches in the SDN network need to be capable of processing the spanning tree protocol, to ensure the interconnection between the SDN network and the conventional network. Therefore, inside the SDN controller, one computation element is configured for each openflow switch in the SDN network, so that the openflow switches in the SDN network can support computation of the spanning tree protocol.

The following briefly describes how the SDN network processes a spanning tree protocol packet when an openflow switch in the SDN network receives a spanning tree protocol packet sent by a switch in the conventional network.

When an openflow switch A in the SDN network receives a spanning tree protocol packet X sent by a switch B in the conventional network, the openflow switch A sends the received spanning tree protocol packet X to the SDN controller in the SDN network through an openflow channel. When the SDN controller receives the spanning tree protocol packet X sent by the openflow switch A, the SDN controller determines a computation element H corresponding to the openflow switch A, and sends the spanning tree protocol packet X to the computation element H. After computing the spanning tree protocol packet X, the computation element H generates a feedback packet Y. The computation element H sends the feedback packet Y to the openflow switch A, so that the openflow switch A sends the feedback packet Y to the switch B in the conventional network, thereby completing computation of a spanning tree protocol between the openflow switch A in the SDN network and the switch B in the conventional network.

A plurality of computation elements in the SDN controller not only receive spanning tree protocol packets sent by the openflow switches, but also send the spanning tree protocol packets to each other, to complete the computation of spanning tree protocols between the plurality of openflow switches in the SDN network, for the purpose of eliminating loops formed between the plurality of openflow switches in the SDN network. However, because the plurality of openflow switches in the SDN network are uniformly managed by the SDN controller, generation of a loop between the plurality of openflow switches in the SDN network is avoided, and the plurality of computation elements in the SDN controller do not need to participate in the computation of the spanning tree protocol.

Therefore, a plurality of computation elements in a conventional SDN controller send spanning tree protocol packets to each other, and computation of spanning tree protocols is performed between the plurality of computation elements, resulting in unnecessary resource overheads for the SDN network.

SUMMARY

Embodiments of this application provide an apparatus and a packet processing method to implement computation of spanning tree protocols of all openflow switches in an SDN network when the SDN network has only one target computing apparatus, thereby reducing unnecessary resource overheads in the SDN network.

The embodiments of this application are implemented as follows.

According to a first aspect, an embodiment of this application provides a packet processing method, where the method is applied to a software-defined networking (SDN) network, the SDN network includes one target computing apparatus and a plurality of openflow switches, the target computing apparatus communicates with the plurality of openflow switches; and the method includes:

receiving, by the target computing apparatus, a first bridge protocol data unit (BPDU) packet sent by a first openflow switch, where the first BPDU packet carries a device identifier and a port identifier, the device identifier is used to indicate the first openflow switch, the port identifier is used to indicate a port that is on the first openflow switch and that receives a second BPDU packet, the second BPDU packet is from a conventional switching device outside the SDN network, the first BPDU packet is obtained by adding the device identifier and the port identifier to the second BPDU packet, the second BPDU packet is used to compute spanning tree protocol information of the conventional switching device, and the plurality of openflow switches include the first openflow switch;

generating, by the target computing apparatus, a feedback packet based on the first BPDU packet, where the feedback packet includes the spanning tree protocol information of the conventional switching device, and carries the port identifier; and sending, by the target computing apparatus, the feedback packet to the first openflow switch based on the device identifier.

In the first aspect, the second BPDU packet that is received by the first openflow switch and that is sent by the conventional switching device needs to be converted into the first BPDU packet, and the first openflow switch sends the first BPDU packet to the target computing apparatus to perform spanning tree protocol computation. After receiving the first BPDU packet that carries the device identifier and that is sent by the first openflow switch, the target computing apparatus may generate the feedback packet based on the first BPDU packet and find the first openflow switch based on the device identifier, and then the target computing apparatus sends the feedback packet to the first openflow switch. The first openflow switch sends the feedback packet to the conventional switching device through a port corresponding to the port identifier, to ensure that the SDN network implements spanning tree protocol computation of the plurality of openflow switches in the SDN network when there is only one target computing apparatus. Because there are no other computing apparatuses except the target computing apparatus in the SDN network, a case in which a plurality of computing apparatuses send BPDU packets to each other in the SDN network is avoided, and a case in which spanning tree protocol computation is performed between the plurality of computing apparatuses is also avoided. Therefore, in this embodiment of this application, unnecessary resource overheads in the SDN network are reduced.

In one embodiment, the feedback packet further includes a bridge identifier of the target computing apparatus, and the bridge identifier is a unique identifier of the target computing apparatus.

The target computing apparatus is the only computing apparatus that runs in the SDN network, and the bridge identifier is the unique identifier of the target computing apparatus, so that a conventional switching device in a conventional network receives a bridge identifier the same as the bridge identifier in the feedback packet sent by the target computing apparatus in the SDN network, and for a plurality of conventional switching devices in the conventional network, the SDN network is equivalent to a switch that has only one bridge identifier. The more switches in the conventional network, the more complex computation of spanning tree protocols becomes, and the fewer switches in the conventional network, the easier the computation of the spanning tree protocols becomes. Therefore, in this embodiment of this application, the plurality of openflow switches in the SDN network may be virtualized as one switch, thereby reducing complexity of the computation of the spanning tree protocols in the conventional network.

In one embodiment, the SDN network further includes an SDN controller, and the SDN controller includes the target computing apparatus.

The SDN network may include one or more SDN controllers. When the SDN network includes one SDN controller, a target computing apparatus may be disposed in the SDN controller, or may be connected to the SDN controller. When the SDN network includes a plurality of SDN controllers, target computing apparatuses may be disposed in the plurality of SDN controllers, or may be connected to the plurality of SDN controllers.

According to a second aspect, an embodiment of this application provides a packet processing method, where the method is applied to an SDN network, the SDN network includes one target computing apparatus and a plurality of openflow switches, and the target computing apparatus communicates with the plurality of openflow switches; and the method includes:

receiving, by a first openflow switch, a second BPDU packet sent by a conventional switching device outside the SDN network, where the plurality of openflow switches include the first openflow switch;

sending, by the first openflow switch, a first BPDU packet to the target computing apparatus, where the first BPDU packet carries a device identifier and a port identifier, the device identifier is used to indicate the first openflow switch, the port identifier is used to indicate a port that is on the first openflow switch and that receives the second BPDU packet, the first BPDU packet is obtained by adding the device identifier and the port identifier to the second BPDU packet, and the second BPDU packet is used to compute spanning tree protocol information of the conventional switching device;

receiving, by the first openflow switch, a feedback packet sent by the target computing apparatus, where the feedback packet is generated by the target computing apparatus based on the first BPDU packet, includes the spanning tree protocol information of the conventional switching device, and carries the port identifier; and sending, by the first openflow switch, the feedback packet to the conventional switching device through a port corresponding to the port identifier.

In the second aspect, the second BPDU packet that is received by the first openflow switch and that is sent by the conventional switching device needs to be converted into the first BPDU packet, and the first openflow switch sends the first BPDU packet to the target computing apparatus to perform spanning tree protocol computation. After receiving the first BPDU packet that carries the device identifier and that is sent by the first openflow switch, the target computing apparatus may generate the feedback packet based on the first BPDU packet and find the first openflow switch based on the device identifier, and then the target computing apparatus sends the feedback packet to the first openflow switch. The first openflow switch sends the feedback packet to the conventional switching device through a port corresponding to the port identifier, to ensure that the SDN network implements spanning tree protocol computation of the plurality of openflow switches in the SDN network when there is only one target computing apparatus. Because there are no other computing apparatuses except the target computing apparatus in the SDN network, a case in which a plurality of computing apparatuses send BPDU packets to each other in the SDN network is avoided, and a case in which spanning tree protocol computation is performed between the plurality of computing apparatuses is also avoided. Therefore, in this embodiment of this application, unnecessary resource overheads in the SDN network are reduced.

In one embodiment, the feedback packet further includes a bridge identifier of the target computing apparatus, and the bridge identifier is a unique identifier of the target computing apparatus.

The target computing apparatus is the only computing apparatus that runs in the SDN network, and the bridge identifier is the unique identifier of the target computing apparatus, so that a conventional switching device in a conventional network receives a bridge identifier the same as the bridge identifier in the feedback packet sent by the target computing apparatus in the SDN network, and for a plurality of conventional switching devices in the conventional network, the SDN network is equivalent to a switch that has only one bridge identifier. The more switches in the conventional network, the more complex computation of spanning tree protocols becomes, and the fewer switches in the conventional network, the easier the computation of the spanning tree protocols becomes. Therefore, in this embodiment of this application, the plurality of openflow switches in the SDN network may be virtualized as one switch, thereby reducing complexity of the computation of the spanning tree protocols in the conventional network.

In one embodiment, the SDN network further includes an SDN controller, and the SDN controller includes the target computing apparatus.

The SDN network may include one or more SDN controllers. When the SDN network includes one SDN controller, a target computing apparatus may be disposed in the SDN controller, or may be connected to the SDN controller. When the SDN network includes a plurality of SDN controllers, target computing apparatuses may be disposed in the plurality of SDN controllers, or may be connected to the plurality of SDN controllers.

According to a third aspect, an embodiment of this application provides a target computing apparatus, where the target computing apparatus is disposed in an SDN network, the SDN network includes one target computing apparatus and a plurality of openflow switches, and the target computing apparatus communicates with a plurality openflow switches, and includes:

a receiving module, configured to receive a first BPDU packet sent by a first openflow switch, where the first BPDU packet carries a device identifier and a port identifier, the device identifier is used to indicate the first openflow switch, the port identifier is used to indicate a port that is on the first openflow switch and that receives a second BPDU packet, the second BPDU packet is from a conventional switching device outside the SDN network, the first BPDU packet is obtained by adding the device identifier and the port identifier to the second BPDU packet, the second BPDU packet is used to compute spanning tree protocol information of the conventional switching device, and the plurality of openflow switches include the first openflow switch;

a generation module, configured to generate a feedback packet based on the first BPDU packet, where the feedback packet includes the spanning tree protocol information of the conventional switching device, and carries the port identifier; and a sending module, configured to send the feedback packet to the first openflow switch based on the device identifier.

In one embodiment, the feedback packet further includes a bridge identifier of the target computing apparatus, and the bridge identifier is a unique identifier of the target computing apparatus.

In one embodiment, the SDN network further includes an SDN controller, and the SDN controller includes the target computing apparatus.

According to a fourth aspect, an embodiment of this application provides an openflow switch, where the openflow switch is disposed in an SDN network, the SDN network includes one target computing apparatus and a plurality of openflow switches, the target computing apparatus communicates with the plurality of openflow switches; and the openflow switch includes:

a first receiving module, configured to receive a second BPDU packet sent by a conventional switching device outside the SDN network;

a first sending module, configured to send a first BPDU packet to the target computing apparatus, where the first BPDU packet carries a device identifier and a port identifier, the device identifier is used to indicate the openflow switch, the port identifier is used to indicate a port that is on the openflow switch and that receives the second BPDU packet, the first BPDU packet is obtained by adding the device identifier and the port identifier to the second BPDU packet, and the second BPDU packet is used to compute spanning tree protocol information of the conventional switching device;

a second receiving module, configured to receive a feedback packet sent by the target computing apparatus, where the feedback packet is generated by the target computing apparatus based on the first BPDU packet, includes the spanning tree protocol information of the conventional switching device, and carries the port identifier; and a second sending module, configured to send the feedback packet to the conventional switching device through a port corresponding to the port identifier.

In one embodiment, the feedback packet further includes a bridge identifier of the target computing apparatus, and the bridge identifier is a unique identifier of the target computing apparatus.

In one embodiment, the SDN network further includes an SDN controller, and the SDN controller includes the target computing apparatus.

According to a fifth aspect, an embodiment of this application provides a target computing apparatus. The target computing apparatus includes a processor and a memory, where the memory stores an operation instruction that is executable by the processor, and the processor reads the operation instruction in the memory to implement the method described in any one of the first aspect or the embodiments of the first aspect.

According to a sixth aspect, an embodiment of this application provides an openflow switch. The openflow switch includes a processor and a memory, where the memory stores an operation instruction that is executable by the processor, and the processor reads the operation instruction in the memory to implement the method described in any one of the second aspect or the embodiments of the second aspect.

DESCRIPTION OF EMBODIMENTS

The following briefly describes several concepts mentioned in the embodiments of this application.

An SDN (software-defined networking) network is a novel network innovation architecture and an implementation of network virtualization. In a core technology, namely, OpenFlow, of the SDN, a control plane and a data plane that are of a network device are separated, so that network traffic can be flexibly controlled, and then a network becomes more intelligent as a channel.

A spanning tree protocol (STP) can be used to establish a tree topology in a network, to eliminate a loop in the network, and can implement path redundancy by using a method. Certainly, to eliminate the loop in the network, the STP may be used to perform spanning tree protocol computation, and a rapid spanning tree protocol (RSTP) or a multiple spanning tree protocol (MSTP) may be used to perform spanning tree protocol computation.

Openflow is a network protocol originated from a Clean Slate project team of Stanford University. The protocol describes a standard for exchanging used information between a controller and a switch, and a standard for interfaces of the controller and the switch.

An SDN controller is an application program in the SDN network and is responsible for traffic control to ensure an intelligent network. The SDN controller informs, by using an OpenFlow protocol, the switch of a destination to which a data packet is sent.

The following describes the technical solutions in the embodiments of this application with reference to the accompanying drawings in the embodiments of this application.

Figure 1:
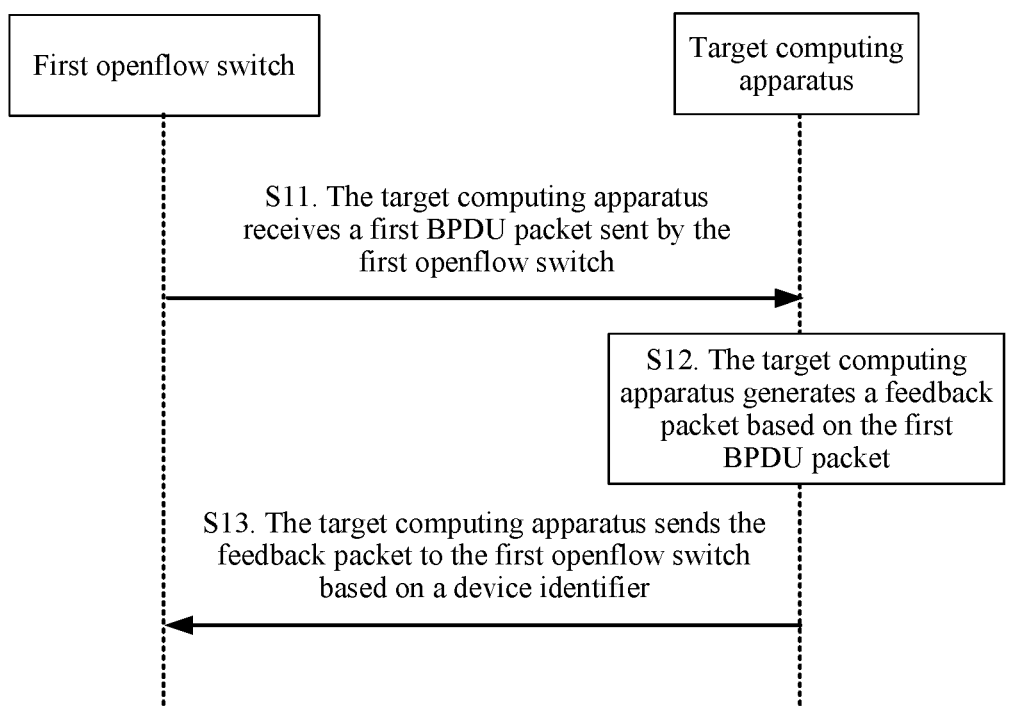
FIG. 1 is a flowchart of a packet processing method according to an embodiment of this application.

FIG. 1 is a flowchart of a packet processing method according to an embodiment of this application. The method shown in FIG. 1 may be applied to an SDN network. The SDN network includes one target computing apparatus and a plurality of openflow switches, and the target computing apparatus communicates with the plurality of openflow switches. In the method shown in FIG. 1, it can be ensured that the SDN network implements spanning tree protocol computation of all openflow switches in the SDN network when the SDN network has only one target computing apparatus. Therefore, a case in which a plurality of computing apparatuses send BPDU packets to each other in the SDN network is avoided, and a case in which spanning tree protocol computation is performed between the plurality of computing apparatuses is also avoided. Therefore, in this embodiment of this application, unnecessary resource overheads in the SDN network are reduced. The method includes the following operations.

Operation S11: The target computing apparatus receives a first BPDU packet sent by a first openflow switch.

The first BPDU (bridge protocol data unit) packet carries a device identifier and a port identifier, where the device identifier is used to indicate the first openflow switch, the port identifier is used to indicate a port that is on the first openflow switch and that receives a second BPDU packet. The second BPDU packet is from a conventional switching device outside the SDN network. The first BPDU packet is obtained by adding the device identifier and the port identifier to the second BPDU packet. The second BPDU packet is used to compute spanning tree protocol information of the conventional switching device. The plurality of openflow switches include the first openflow switch. A target computation element is the only computing apparatus that runs in the SDN network.

The second BPDU packet mentioned in operation S11 is a conventional BPDU packet, and the first BPDU packet is an extension of the conventional BPDU packet. For example, a type-length-value (TLV) is added to the conventional BPDU packet to carry the device identifier and the port identifier, to form the first BPDU packet. The type in the TLV indicates a meaning of a data packet, and the type includes a type of a single data packet and a type of a nested data packet; the length in the TLV indicates a size of the data packet; and the value in the TLV includes actual content of the data packet.

The second BPDU packet includes a configuration BPDU packet and a topology change notification (TCN) BPDU packet. When switching devices perform spanning tree protocol computation for the first time in a network, the switching devices send configuration BPDU packets to each other. When the switching devices perform spanning tree protocol computation for the first time in the network and a topology in the network changes, the switching devices send TCN BPDU packets to each other, where the TCN BPDU packet is used to notify related switching devices of changes in the network.

When the SDN network is connected to a conventional network outside the SDN network, the plurality of openflow switches in the SDN network are connected to a conventional switching device in the conventional network. To avoid a loop formed between the plurality of openflow switches in the SDN network and the conventional switching device, the target computing apparatus sends a BPDU packet to the conventional switching device through the plurality of openflow switches in the SDN network. At the same time, the conventional switching device connected to the plurality of openflow switches in the SDN network also sends a BPDU packet to the target computing apparatus through the plurality of openflow switches in the SDN network.

When the first openflow switch in the SDN network receives the second BPDU packet sent by the conventional switching device, the first openflow switch adds the device identifier and the port identifier of the first openflow switch to the second BPDU packet to generate the first BPDU packet, where the port identifier is used to indicate the port that is on the first openflow switch and that receives the second BPDU packet; and then the first openflow switch sends the generated first BPDU packet to the target computing apparatus. The purpose of sending, by the first openflow switch, the device identifier and the port identifier to the target computing apparatus is as follows: The target computing apparatus receives the first BPDU packet sent by the first openflow switch, and after generating a feedback packet based on the first BPDU packet, the target computing apparatus further needs to return the feedback packet to the first openflow switch that sends the first BPDU packet, so that the device identifier and the port identifier may reflect which port of which openflow switch in the SDN network the first BPDU packet comes from, and then the target computing apparatus may accurately send the feedback packet to the first openflow switch that sends the first BPDU packet.

After receiving the first BPDU packet sent by the first openflow switch, the target computing apparatus records a correspondence between the first BPDU packet and the device identifier and the port identifier that are in the first BPDU packet.

Figure 2:
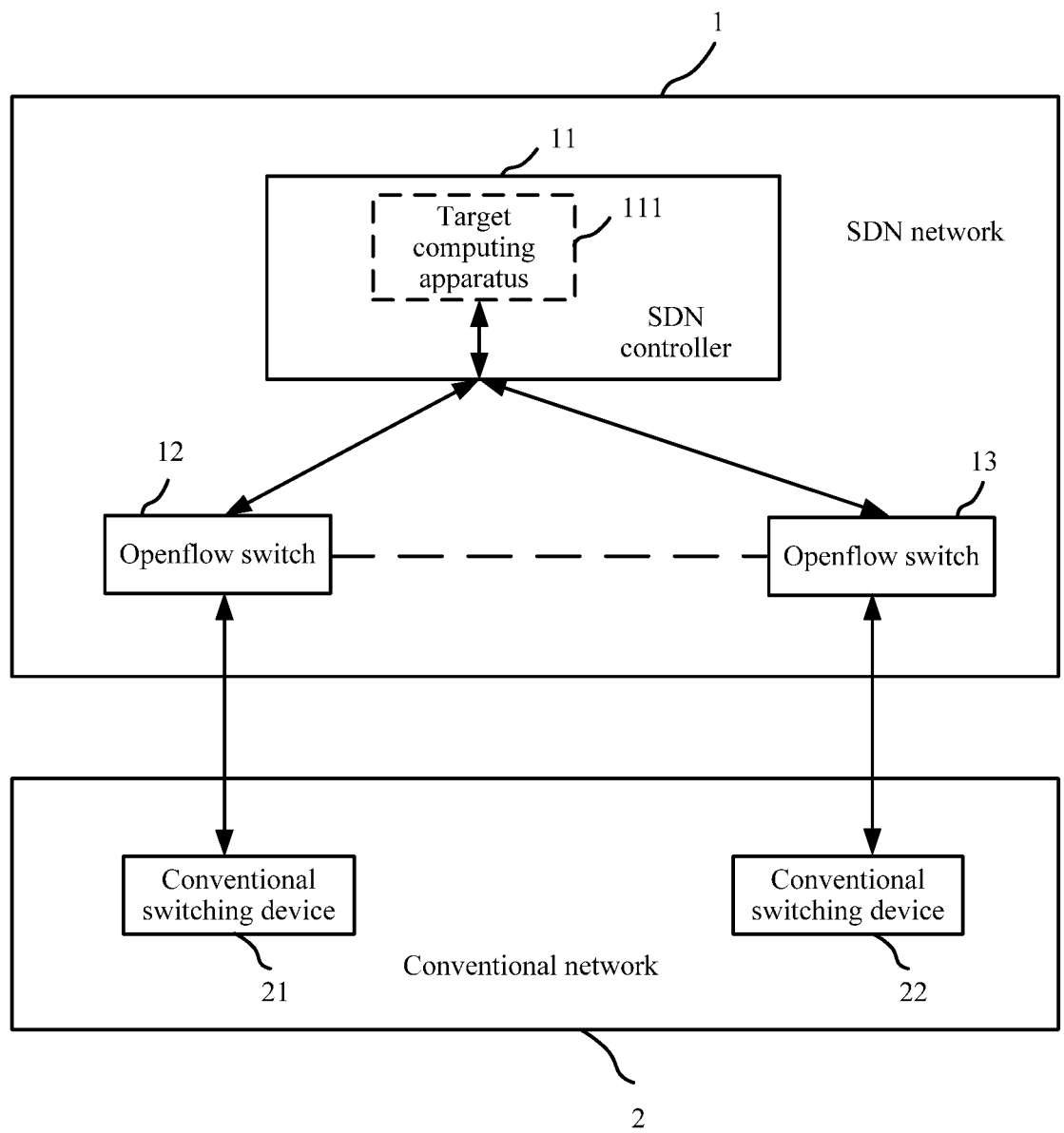
FIG. 2 is a schematic block diagram of interconnection between an SDN network 1 and a conventional network 2 according to an embodiment of this application.

FIG. 2 is a schematic block diagram of interconnection between an SDN network 1 and a conventional network 2 according to an embodiment of this application. Table 1 shows a correspondence between the first BPDU packet and the device identifier and the port identifier.

Refer to FIG. 2 and Table 1. For example, it is assumed that the SDN network 1 includes an SDN controller 11, an openflow switch 12, and an openflow switch 13, where the SDN controller 11 includes a target computing apparatus 111, a device identifier of the openflow switch 12 is S1, and a device identifier of the openflow switch 13 is S2. A conventional switching device 21 in the conventional network 2 is connected to the openflow switch 12, and a conventional switching device 22 in the conventional network 2 is connected to the openflow switch 13. The openflow switch 12 receives, through a port whose port identifier is T11, a BPDU packet A1 sent by the conventional switching device 21. The openflow switch 12 adds the device identifier S1 and the port identifier T11 to the BPDU packet A1 to generate a BPDU packet B1, and the openflow switch 12 sends the BPDU packet B1 to the target computing apparatus 111. The openflow switch 13 receives, through a port whose port identifier is T21, a BPDU packet A2 sent by the conventional switching device 22. The openflow switch 13 adds the device identifier S2 and the port identifier T21 to the BPDU packet A2 to generate a BPDU packet B2, and the openflow switch 13 sends the BPDU packet B2 to the target computing apparatus 111. After the target computing apparatus 111 receives the BPDU packet B1 and the BPDU packet B2, the target computing apparatus records a correspondence between B1 and (S1, T11) shown in Table 1, and records a correspondence between B2 and (S2, T21).

TABLE 1

| BPDU packet | (Device identifier, port identifier) |
|---|---|
| B1 | (S1, T11) |
| B2 | (S2, T21) |

Operation S12: The target computing apparatus generates a feedback packet based on the first BPDU packet.

The feedback packet includes the spanning tree protocol information of the conventional switching device, and carries a port identifier, and the port identifier is used to indicate a port that is on the first openflow switch and that receives the second BPDU packet.

After receiving the first BPDU packet, the target computing apparatus may perform spanning tree protocol computation based on the spanning tree protocol information in the first BPDU packet, add spanning tree protocol information obtained by the spanning tree protocol computation to the feedback packet, and add the port identifier to the feedback packet.

For a process in which the target computing apparatus performs spanning tree protocol computation based on the spanning tree protocol information in the first BPDU packet, refer to a computation rule of a spanning tree protocol. Details are not described herein again.

After generating the feedback packet based on the first BPDU packet, the target computing apparatus records a correspondence between the first BPDU packet and the feedback packet.

Refer to FIG. 2 and Table 2. Table 2 shows a correspondence between a BPDU packet and a feedback packet. For example, it is assumed that the target computing apparatus 111 generates a feedback packet C1 based on the BPDU packet B1, and generates a feedback packet C2 based on the BPDU packet B2. The target computing apparatus 111 records a correspondence between the BPDU packet B1 and the feedback packet C1 shown in Table 2, and records a correspondence between the BPDU packet B2 and the feedback packet C2.

TABLE 2

| BPDU packet | Feedback packet |
|---|---|
| B1 | C1 |
| B2 | C2 |

Operation S13: The target computing apparatus sends the feedback packet to the first openflow switch based on the device identifier.

After generating the feedback packet based on the first BPDU packet, the target computing apparatus determines a correspondence between the feedback packet and the device identifier and the port identifier based on the correspondence between the first BPDU packet and the device identifier and the port identifier and the correspondence between the first BPDU packet and the feedback packet.

Refer to FIG. 2 and Table 3. Table 3 shows the correspondence between the feedback packet and the device identifier and the port identifier. For example, it is assumed that the openflow switch 12 receives, through the port T11, the BPDU packet B1 sent by the conventional switching device 21, and the openflow switch 13 receives, through the port T21, the BPDU packet B2 sent by the conventional switching device 22. The target computing apparatus 111 records a correspondence between the BPDU packet B1 and (device identifier S1, port identifier T11), and records a correspondence between the BPDU packet B2 and (device identifier S2, port identifier T21). In addition, the target computing apparatus 111 generates the feedback packet C1 based on the BPDU packet B1, generates the feedback packet C2 based on the BPDU packet B2, records the correspondence between the BPDU packet B1 and the feedback packet C1, and records the correspondence between the BPDU packet B2 and the feedback packet C2. In this case, the target computing apparatus 111 may determine, based on the correspondence between the BPDU packet and the device identifier and the port identifier and the correspondence between the BPDU packet and the feedback packet, the correspondence between the feedback packet and the device identifier and the port identifier shown in Table 3.

TABLE 3

| Feedback packet | (Device identifier, port identifier) |
|---|---|
| C1 | (S1, T11) |
| C2 | (S2, T21) |

After determining the correspondence between the feedback packet and the device identifier and the port identifier, the target computing apparatus may determine, based on the correspondence between the feedback packet and the device identifier and the port identifier, the device identifier and the port identifier that correspond to the feedback packet. Then, the target computing apparatus sends, based on the device identifier, the feedback packet that has the port identifier to the first openflow switch.

For example, refer to FIG. 2 and Table 3. It is assumed that the target computing apparatus 111 determines that the correspondence between the feedback packet and the device identifier and the port identifier is that a correspondence exists between C1 and (S1, T11), and a correspondence exists between C2 and (S2, T21). In this case, the target computing apparatus 111 may send, based on the two correspondences, the feedback packet and the port identifier to the openflow switch 12 corresponding to the device identifier. In one embodiment, the target computing apparatus 111 sends the feedback packet C1 and the port identifier T11 to the openflow switch 12 corresponding to the device identifier S1, and sends the feedback packet C2 and the port identifier T21 to the openflow switch 13 corresponding to the device identifier S2.

After the target computing apparatus sends the feedback packet to the first openflow switch based on the device identifier, the first openflow switch may send the feedback packet to the conventional switching device through a port corresponding to the port identifier.

In the embodiment shown in FIG. 1, the second BPDU packet that is received by the first openflow switch and that is sent by the conventional switching device needs to be converted into the first BPDU packet, and the first openflow switch sends the first BPDU packet to the target computing apparatus to perform spanning tree protocol computation. After receiving the first BPDU packet that carries the device identifier and that is sent by the first openflow switch, the target computing apparatus may generate the feedback packet based on the first BPDU packet and find the first openflow switch based on the device identifier, and then the target computing apparatus sends the feedback packet to the first openflow switch. The first openflow switch sends the feedback packet to the conventional switching device through the port corresponding to the port identifier, to ensure that the SDN network implements spanning tree protocol computation of the plurality of openflow switches in the SDN network when there is only one target computing apparatus. Because there are no other computing apparatuses except the target computing apparatus in the SDN network, a case in which a plurality of computing apparatuses send BPDU packets to each other in the SDN network is avoided, and a case in which spanning tree protocol computation is performed between the plurality of computing apparatuses is also avoided. Therefore, in this embodiment of this application, unnecessary resource overheads in the SDN network are reduced.

In one embodiment, in operation S12 of the embodiment shown in FIG. 1, the feedback packet may further include a bridge identifier of the target computing apparatus, and the bridge identifier is a unique identifier of the target computing apparatus.

A function of adding the bridge identifier of the target computing apparatus to the feedback packet is as follows: The target computing apparatus is the only computing apparatus that runs in the SDN network, and the bridge identifier is the unique identifier of the target computing apparatus, so that a conventional switching device in a conventional network receives a bridge identifier the same as the bridge identifier in the feedback packet sent by the target computing apparatus in the SDN network, and for a plurality of conventional switching devices in the conventional network, the SDN network is equivalent to a switch that has only one bridge identifier. The more switches in the conventional network, the more complex computation of spanning tree protocols becomes, and the fewer switches in the conventional network, the easier the computation of the spanning tree protocols becomes. Therefore, in this embodiment of this application, the plurality of openflow switches in the SDN network may be virtualized as one switch, thereby reducing complexity of the computation of the spanning tree protocols in the conventional network.

In one embodiment, in the embodiment shown in FIG. 1, the SDN network further includes an SDN controller, and the SDN controller includes the target computing apparatus. The SDN network may include one or more SDN controllers. When the SDN network includes one SDN controller, a target computing apparatus may be disposed in the SDN controller, or may be connected to the SDN controller. When the SDN network includes a plurality of SDN controllers, target computing apparatuses may be disposed in the plurality of SDN controllers, or may be connected to the plurality of SDN controllers.

Figure 3:
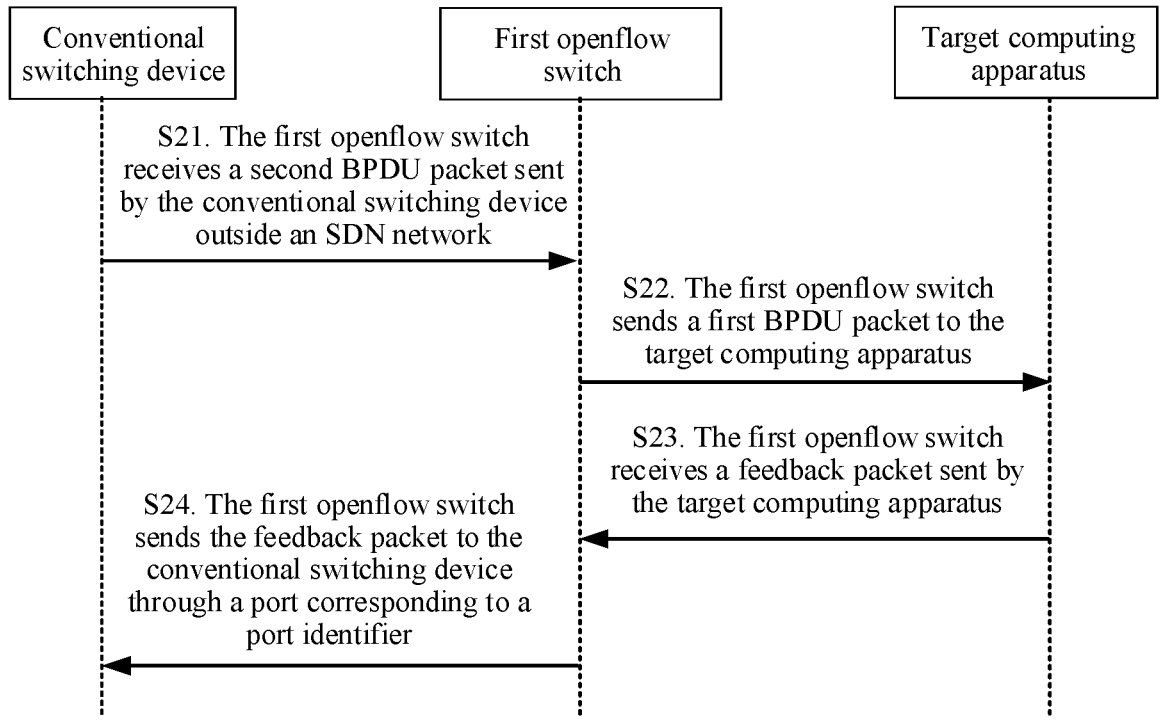
FIG. 3 is a flowchart of another packet processing method according to an embodiment of this application.

FIG. 3 is a flowchart of another packet processing method according to an embodiment of this application. The method shown in FIG. 3 may be applied to an SDN network. The SDN network includes one target computing apparatus and a plurality of openflow switches, and the target computing apparatus communicates with the plurality of openflow switches. In the method shown in FIG. 3, it can be ensured that the SDN network implements spanning tree protocol computation of all openflow switches in the SDN network when the SDN network has only one target computing apparatus. Therefore, a case in which a plurality of computing apparatuses send BPDU packets to each other in the SDN network is avoided, and a case in which spanning tree protocol computation is performed between the plurality of computing apparatuses is also avoided. Therefore, in this embodiment of this application, unnecessary resource overheads in the SDN network are reduced. Because the method shown in FIG. 1 may be applied to a target computing apparatus in the SDN network, and the method shown in FIG. 3 may be applied to an openflow switch in the SDN network, in the embodiment shown in FIG. 3, for content the same as that in the embodiment shown in FIG. 1, refer to the embodiment shown in FIG. 1. The method shown in FIG. 3 includes the following operations.

Operation S21: A first openflow switch receives a second BPDU packet sent by a conventional switching device outside the SDN network.

The plurality of openflow switches include the first openflow switch.

Operation S22: The first openflow switch sends a first BPDU packet to the target computing apparatus.

The first BPDU packet carries a device identifier and a port identifier. The device identifier is used to indicate the first openflow switch, and the port identifier is used to indicate a port that is on the first openflow switch and that receives the second BPDU packet. The first BPDU packet is obtained by adding the device identifier and the port identifier to the second BPDU packet. The second BPDU packet is used to compute spanning tree protocol information of the conventional switching device.

Operation S23: The first openflow switch receives a feedback packet sent by the target computing apparatus.

The feedback packet is generated by the target computing apparatus based on the first BPDU packet, includes the spanning tree protocol information of the conventional switching device, and carries the port identifier.

Operation S24: The first openflow switch sends the feedback packet to the conventional switching device through a port corresponding to the port identifier.

In the embodiment shown in FIG. 3, the second BPDU packet that is received by the first openflow switch and that is sent by the conventional switching device needs to be converted into the first BPDU packet, and the first openflow switch sends the first BPDU packet to the target computing apparatus to perform spanning tree protocol computation. After receiving the first BPDU packet that carries the device identifier and that is sent by the first openflow switch, the target computing apparatus may generate the feedback packet based on the first BPDU packet and find the first openflow switch based on the device identifier, and then the target computing apparatus sends the feedback packet to the first openflow switch. The first openflow switch sends the feedback packet to the conventional switching device through the port corresponding to the port identifier, to ensure that the SDN network implements spanning tree protocol computation of the plurality of openflow switches in the SDN network when there is only one target computing apparatus. Because there are no other computing apparatuses except the target computing apparatus in the SDN network, a case in which a plurality of computing apparatuses send BPDU packets to each other in the SDN network is avoided, and a case in which spanning tree protocol computation is performed between the plurality of computing apparatuses is also avoided. Therefore, in this embodiment of this application, unnecessary resource overheads in the SDN network are reduced.

Figure 4:
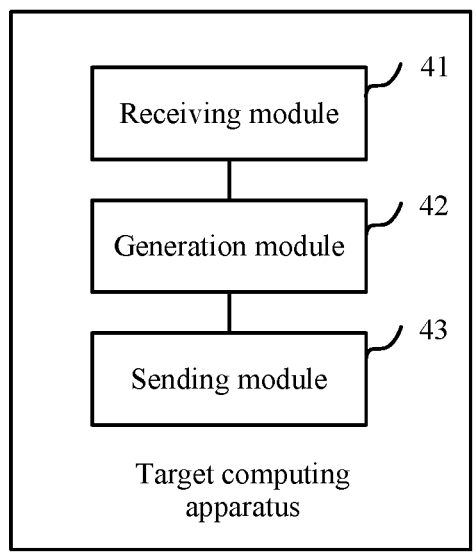
FIG. 4 is a schematic diagram of a target computing apparatus according to an embodiment of this application.

FIG. 4 is a schematic diagram of a target computing apparatus according to an embodiment of this application. FIG. 4 shows an apparatus embodiment corresponding to FIG. 1. In FIG. 4, for content the same as that in FIG. 1, refer to the embodiment corresponding to FIG. 1. Referring to FIG. 4, the target computing apparatus includes the following modules: a receiving module 41, a generation module 42, and a sending module 43.

The receiving module 41 is configured to receive a first BPDU packet sent by a first openflow switch.

The target computing apparatus shown in FIG. 4 is disposed in an SDN network, the SDN network includes one target computing apparatus and a plurality of openflow switches, and the target computing apparatus communicates with the plurality of openflow switches.

The first BPDU packet carries a device identifier and a port identifier. The device identifier is used to indicate the first openflow switch, and the port identifier is used to indicate a port that is on the first openflow switch and that receives a second BPDU packet. The second BPDU packet is from a conventional switching device outside the SDN network. The first BPDU packet is obtained by adding the device identifier and the port identifier to the second BPDU packet. The second BPDU packet is used to compute spanning tree protocol information of the conventional switching device. The plurality of openflow switches include the first openflow switch.

The generation module 42 is configured to generate a feedback packet based on the first BPDU packet.

The feedback packet includes the spanning tree protocol information of the conventional switching device, and carries the port identifier.

The sending module 43 is configured to send the feedback packet to the first openflow switch based on the device identifier.

In the embodiment shown in FIG. 4, the feedback packet further includes a bridge identifier of the target computing apparatus, and the bridge identifier is a unique identifier of the target computing apparatus.

In the embodiment shown in FIG. 4, the SDN network further includes an SDN controller, and the SDN controller includes the target computing apparatus.

In the embodiment shown in FIG. 4, the second BPDU packet that is received by the first openflow switch and that is sent by the conventional switching device needs to be converted into the first BPDU packet, and the first openflow switch sends the first BPDU packet to the target computing apparatus to perform spanning tree protocol computation. After receiving the first BPDU packet that carries the device identifier and that is sent by the first openflow switch, the target computing apparatus may generate the feedback packet based on the first BPDU packet and find the first openflow switch based on the device identifier, and then the target computing apparatus sends the feedback packet to the first openflow switch. The first openflow switch sends the feedback packet to the conventional switching device through a port corresponding to the port identifier, to ensure that the SDN network implements spanning tree protocol computation of the plurality of openflow switches in the SDN network when there is only one target computing apparatus. Because there are no other computing apparatuses except the target computing apparatus in the SDN network, a case in which a plurality of computing apparatuses send BPDU packets to each other in the SDN network is avoided, and a case in which spanning tree protocol computation is performed between the plurality of computing apparatuses is also avoided. Therefore, in this embodiment of this application, unnecessary resource overheads in the SDN network are reduced.

Figure 5:
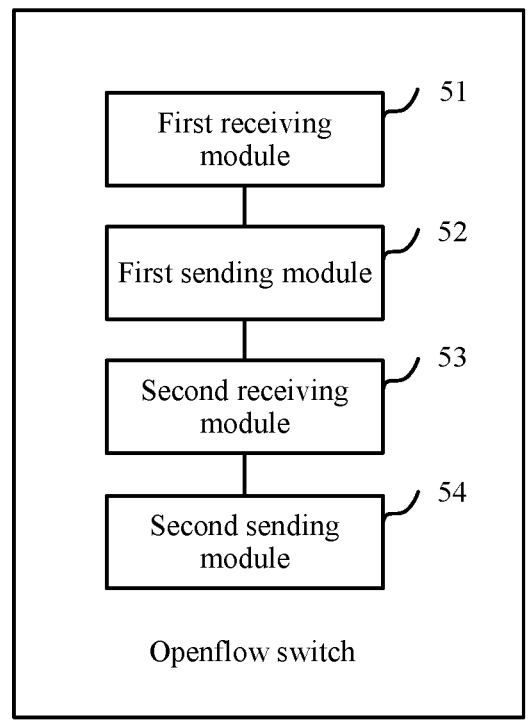
FIG. 5 is a schematic diagram of an openflow switch according to an embodiment of this application.

FIG. 5 is a schematic diagram of an openflow switch according to an embodiment of this application. FIG. 5 shows an apparatus embodiment corresponding to FIG. 3. In FIG. 5, for content the same as that in FIG. 3, refer to the embodiment corresponding to FIG. 3. Referring to FIG. 5, the openflow switch includes the following modules: a first receiving module 51, a first sending module 52, a second receiving module 53, and a second sending module 54.

The first receiving module 51 is configured to receive a second BPDU packet sent by a conventional switching device outside an SDN network.

The openflow switch shown in FIG. 5 is disposed in the SDN network, the SDN network includes one target computing apparatus and a plurality of openflow switches, and the target computing apparatus communicates with the plurality of openflow switches.

The first sending module 52 is configured to send a first BPDU packet to the target computing apparatus.

The first BPDU packet carries a device identifier and a port identifier. The device identifier is used to indicate the first openflow switch, and the port identifier is used to indicate a port that is on the first openflow switch and that receives the second BPDU packet. The first BPDU packet is obtained by adding the device identifier and the port identifier to the second BPDU packet. The second BPDU packet is used to compute spanning tree protocol information of the conventional switching device.

The second receiving module 53 is configured to receive a feedback packet sent by the target computing apparatus.

The feedback packet is generated by the target computing apparatus based on the first BPDU packet, includes the spanning tree protocol information of the conventional switching device, and carries the port identifier.

The second sending module 54 is configured to send the feedback packet to the conventional switching device through a port corresponding to the port identifier.

In the embodiment shown in FIG. 5, the feedback packet further includes a bridge identifier of the target computing apparatus, and the bridge identifier is a unique identifier of the target computing apparatus.

In the embodiment shown in FIG. 5, the SDN network further includes an SDN controller, and the SDN controller includes the target computing apparatus.

In the embodiment shown in FIG. 5, the second BPDU packet that is received by the first openflow switch and that is sent by the conventional switching device needs to be converted into the first BPDU packet, and the first openflow switch sends the first BPDU packet to the target computing apparatus to perform spanning tree protocol computation. After receiving the first BPDU packet that carries the device identifier and that is sent by the first openflow switch, the target computing apparatus may generate the feedback packet based on the first BPDU packet and find the first openflow switch based on the device identifier, and then the target computing apparatus sends the feedback packet to the first openflow switch. The first openflow switch sends the feedback packet to the conventional switching device through the port corresponding to the port identifier, to ensure that the SDN network implements spanning tree protocol computation of the plurality of openflow switches in the SDN network when there is only one target computing apparatus. Because there are no other computing apparatuses except the target computing apparatus in the SDN network, a case in which a plurality of computing apparatuses send BPDU packets to each other in the SDN network is avoided, and a case in which spanning tree protocol computation is performed between the plurality of computing apparatuses is also avoided. Therefore, in this embodiment of this application, unnecessary resource overheads in the SDN network are reduced.

Figure 6:
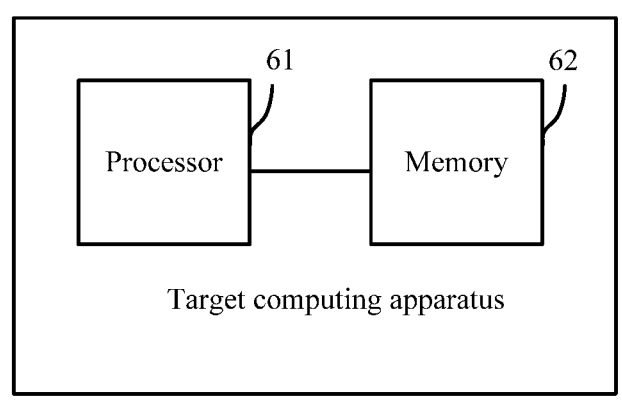
FIG. 6 is a schematic diagram of another target computing apparatus according to an embodiment of this application.

FIG. 6 is a schematic diagram of another target computing apparatus according to an embodiment of this application. FIG. 6 shows an apparatus embodiment corresponding to FIG. 1. In FIG. 6, for content the same as that in FIG. 1, refer to the embodiment corresponding to FIG. 1. Referring to FIG. 6, the apparatus includes a processor 61 and a memory 62. The memory 62 stores an operation instruction that is executable by the processor 61, and the processor 61 reads the operation instruction in the memory 62 to implement the method shown in FIG. 1.

Figure 7:
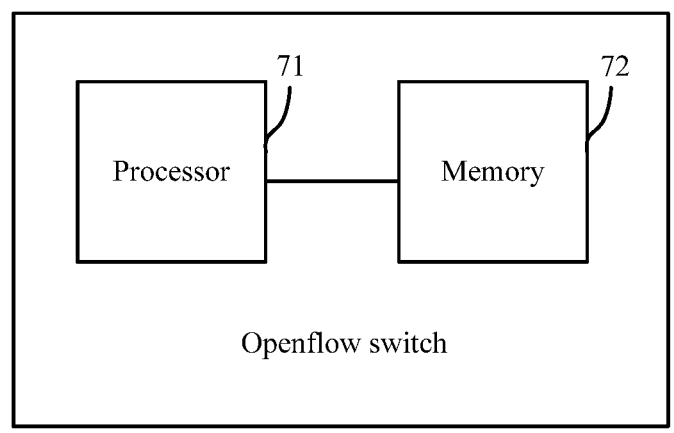
FIG. 7 is a schematic diagram of another openflow switch according to an embodiment of this application.

FIG. 7 is a schematic diagram of another openflow switch according to an embodiment of this application. FIG. 7 shows an apparatus embodiment corresponding to FIG. 3. In FIG. 7, for content the same as that in FIG. 3, refer to the embodiment corresponding to FIG. 3. Referring to FIG. 7, the apparatus includes a processor 71 and a memory 72. The memory 72 stores an operation instruction that is executable by the processor 71, and the processor 71 reads the operation instruction in the memory 72 to implement the method shown in FIG. 3.

It should be noted that the embodiments provided in this application are merely example embodiments described in this application. Based on this, a person skilled in the art can design more embodiments, and details are not described herein again.

A person of ordinary skill in the art may be aware that, in combination with the examples described in the embodiments disclosed in this specification, units and algorithm operations may be implemented by using electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed operating process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions of the embodiments.

In addition, functional units in the embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A packet processing method, wherein the method is applied to a software-defined networking (SDN) network, the SDN network comprises a target computing apparatus and a plurality of openflow switches, and the target computing apparatus communicates with the plurality of openflow switches, the method comprising:

receiving, by the target computing apparatus, a first bridge protocol data unit (BPDU) packet sent by a first openflow switch, wherein the first BPDU packet carries a device identifier and a port identifier, the device identifier is used to indicate the first openflow switch, the port identifier is used to indicate a port that is on the first openflow switch and that receives a second BPDU packet, the second BPDU packet is from a conventional switching device outside the SDN network, the first BPDU packet is obtained by adding the device identifier and the port identifier to the second BPDU packet, the second BPDU packet is used to compute spanning tree protocol information of the conventional switching device, and the plurality of openflow switches comprise the first openflow switch;

generating, by the target computing apparatus, a feedback packet based on the first BPDU packet, wherein the feedback packet comprises the spanning tree protocol information of the conventional switching device, and carries the port identifier; and sending, by the target computing apparatus, the feedback packet to the first openflow switch based on the device identifier.

2. The packet processing method according to claim 1, wherein the feedback packet further comprises a bridge identifier of the target computing apparatus, and the bridge identifier is a unique identifier of the target computing apparatus.

3. The packet processing method according to claim 1, wherein the SDN network further comprises an SDN controller, and the SDN controller comprises the target computing apparatus.

4. A target computing apparatus, wherein the target computing apparatus is included in a software-defined networking (SDN) network, the SDN network comprises the target computing apparatus and a plurality of openflow switches, and the target computing apparatus communicates with the plurality of openflow switches, and the target computing apparatus comprises:

a memory configured to store a computer program instruction; and a processor configured to read the computer program instruction to perform:

receiving a first BPDU packet sent by a first openflow switch, wherein the first bridge protocol data unit (BPDU) packet carries a device identifier and a port identifier, the device identifier is used to indicate the first openflow switch, the port identifier is used to indicate a port that is on the first openflow switch and that receives a second BPDU packet, the second BPDU packet is from a conventional switching device outside the SDN network, the first BPDU packet is obtained by adding the device identifier and the port identifier to the second BPDU packet, the second BPDU packet is used to compute spanning tree protocol information of the conventional switching device, and the plurality of openflow switches comprise the first openflow switch;

generating a feedback packet based on the first BPDU packet, wherein the feedback packet comprises the spanning tree protocol information of the conventional switching device, and the feedback packet carries the port identifier; and sending the feedback packet to the first openflow switch based on the device identifier.

5. The target computing apparatus according to claim 4, wherein the feedback packet further comprises a bridge identifier of the target computing apparatus, and the bridge identifier is a unique identifier of the target computing apparatus.

6. The target computing apparatus according to claim 4, wherein the SDN network further comprises an SDN controller, and the SDN controller comprises the target computing apparatus.

7. An openflow switch, wherein the openflow switch is included in a-software-defined networking (SDN) network, the SDN network comprises a target computing apparatus and a plurality of openflow switches, and the target computing apparatus communicates with the plurality of openflow switches, and the openflow switch comprises:

a memory configured to store a computer program instruction; and a processor configured to read the computer program instruction to perform:

receiving a second BPDU packet sent by a conventional switching device outside the SDN;

sending a first bridge protocol data unit (BPDU) packet to the target computing apparatus, wherein the first BPDU packet carries a device identifier and a port identifier, the device identifier is used to indicate the openflow switch, the port identifier is used to indicate a port that is on the openflow switch and that receives the second BPDU packet, the first BPDU packet is obtained by adding the device identifier and the port identifier to the second BPDU packet, and the second BPDU packet is used to compute spanning tree protocol information of the conventional switching device;

receiving a feedback packet sent by the target computing apparatus, wherein the feedback packet is generated by the target computing apparatus based on the first BPDU packet and comprises the spanning tree protocol information of the conventional switching device and carries the port identifier; and sending the feedback packet to the conventional switching device through the port corresponding to the port identifier.

8. The openflow switch according to claim 7, wherein the feedback packet further comprises a bridge identifier of the target computing apparatus, and the bridge identifier is a unique identifier of the target computing apparatus.

9. The openflow switch according to claim 7, wherein the SDN network further comprises an SDN controller, and the SDN controller comprises the target computing apparatus.

* * * * *